US008005981B2

(12) United States Patent
Tuck et al.

(10) Patent No.: US 8,005,981 B2
(45) Date of Patent: Aug. 23, 2011

(54) COMPUTER NETWORK WITH UNIQUE IDENTIFICATION

(75) Inventors: Teo Wee Tuck, Singapore (SG); Rhandeev Singh, Singapore (SG)

(73) Assignee: Advanced Network Technology Laboratories Pte Ltd., Singapore (SG)

( * ) Notice: Subject to any disclaimer, the term of this patent is extended or adjusted under 35 U.S.C. 154(b) by 800 days.

(21) Appl. No.: 10/480,391

(22) PCT Filed: Jun. 15, 2001

(86) PCT No.: PCT/SG01/00121
§ 371 (c)(1),
(2), (4) Date: Dec. 11, 2003

(87) PCT Pub. No.: WO02/103547
PCT Pub. Date: Dec. 27, 2002

(65) Prior Publication Data
US 2004/0249975 A1    Dec. 9, 2004

(51) Int. Cl.
*G06F 15/173* (2006.01)
(52) U.S. Cl. ...................................................... 709/238
(58) Field of Classification Search .......... 709/217–219, 709/220–222, 223–225, 227–229, 238
See application file for complete search history.

(56) References Cited

U.S. PATENT DOCUMENTS

| | | | |
|---|---|---|---|
| 5,621,726 A | 4/1997 | Murakimi | |
| 5,751,967 A | 5/1998 | Raab et al. | |
| 5,757,795 A * | 5/1998 | Schnell | 370/392 |
| 5,892,912 A | 4/1999 | Suzuki et al. | |
| 5,926,463 A | 7/1999 | Ahearn et al. | |
| 5,946,308 A | 8/1999 | Dobbins et al. | |
| 6,041,358 A | 3/2000 | Huang et al. | |
| 6,049,528 A | 4/2000 | Hendel et al. | |

(Continued)

FOREIGN PATENT DOCUMENTS

CA    2183411    2/1997
(Continued)

OTHER PUBLICATIONS

Supplementary Partial European Search Report, EP 01 93 8963, dated Apr. 2, 2007, (4 pages).

(Continued)

*Primary Examiner* — Jeffery Pwu
*Assistant Examiner* — Scott M Sciacca
(74) *Attorney, Agent, or Firm* — TraskBritt

(57) ABSTRACT

A computer network is described in which the data link layer address, e.g., MAC address, of the network cards of client nodes are used to uniquely identify the nodes in the provision of network to application layer services. A link layer aware router may determine the MAC address of a client node from a data packet transmitted by the client node, and determines the services to provide to the user, e.g., a proxy redirect of the packet, based on a database of client node MAC addresses to user attributes. By determining MAC addresses, the router can also identify unregistered MAC addresses, and can forward an HTTP request by an unregistered user to a remote configuration web page for registering the user, or to a security warning web page. The router may also support Network Address Translation and Domain Name System services using the MAC addresses, with a fully qualified domain name, hostname, or the like, being assigned to the MAC addresses.

22 Claims, 10 Drawing Sheets

U.S. PATENT DOCUMENTS

| | | | |
|---|---|---|---|
| 6,122,268 | A | 9/2000 | Okanoue et al. |
| 6,130,892 | A | 10/2000 | Short et al. |
| 6,178,455 | B1 | 1/2001 | Schutte et al. |
| 6,272,152 | B1 * | 8/2001 | Levin et al. ............. 370/490 |
| 6,434,627 | B1 | 8/2002 | Millet et al. |
| 6,442,586 | B1 | 8/2002 | Glass |
| 6,473,411 | B1 | 10/2002 | Kumaki et al. |
| 6,515,974 | B1 | 2/2003 | Inoue et al. |
| 6,535,493 | B1 | 3/2003 | Lee et al. |
| 6,556,541 | B1 | 4/2003 | Bare |
| 6,580,715 | B1 | 6/2003 | Bare |
| 6,636,894 | B1 | 10/2003 | Short et al. |
| 6,801,496 | B1 | 10/2004 | Saleh et al. |
| 6,823,454 | B1 * | 11/2004 | Hind et al. ............. 713/168 |
| 6,834,389 | B1 | 12/2004 | Glass |
| 6,856,602 | B1 | 2/2005 | Westberg |
| 6,934,292 | B1 | 8/2005 | Ammitzboell |
| 6,982,953 | B1 * | 1/2006 | Swales ............. 370/218 |
| 6,987,756 | B1 * | 1/2006 | Ravindranath et al. ....... 370/352 |
| 7,010,585 | B2 * | 3/2006 | Asami ............. 709/220 |
| 7,016,352 | B1 * | 3/2006 | Chow et al. ............. 370/392 |
| 7,055,173 | B1 * | 5/2006 | Chaganty et al. ............. 726/11 |
| 7,296,088 | B1 * | 11/2007 | Padmanabhan et al. ...... 709/238 |
| 2001/0044903 | A1 * | 11/2001 | Yamamoto et al. ........... 713/200 |
| 2002/0032855 | A1 * | 3/2002 | Neves et al. ............. 713/154 |
| 2002/0133573 | A1 * | 9/2002 | Matsuda et al. ............. 709/220 |
| 2003/0053459 | A1 * | 3/2003 | Brouk et al. ............. 370/392 |
| 2004/0027995 | A1 | 2/2004 | Miller et al. |

FOREIGN PATENT DOCUMENTS

| | | |
|---|---|---|
| EP | 0835009 A2 | 4/1998 |
| EP | 0835009 A3 | 4/1998 |
| EP | 0 883 266 A2 | 12/1998 |
| EP | 0883266 A2 | 12/1998 |
| EP | 1 001 584 A | 5/2000 |
| GB | 2283645 A | 5/1995 |
| JP | 11-266278 | 9/1999 |
| JP | 2000 101589 A | 4/2000 |
| JP | 2000101589 | 4/2000 |
| JP | 2000112851 | 4/2000 |
| WO | WO 97/48210 | 12/1997 |
| WO | WO 01/14988 A1 | 3/2001 |
| WO | WO 02/15491 A1 | 2/2002 |

OTHER PUBLICATIONS

Touch, J., et al., Dynamic Host Routing for Production Use of Developmental Networks, ICNP '97, Oct. 28-31, 1997, pp. 285-292, © 1997 IEEE.

Murthy, S., et al., Loop-Free Internet Routing Using Hierarchical Routing Trees, Proc. of INFOCOM '97 16th Annual Joint Conf. of IEEE Computer and Communications Societies, 1997, pp. 101-108, © 1997 IEEE.

Akyldiz, I.F., et al., A New Hierarchical Routing Protocol for Dynamic Multihop Wireless Networks, Proc. Of INFOCOM '97 16th Annual Joint Conf. of IEEE Computer and Communications Societies. 1997, pp. 1422-1429, © 1997 IEEE.

Comer, D., Internetworking with TCP/IP, vol. 1, Principles, Protocols, and Architecture, 3d Ed., 1998 (approx.), pp. 245-247, 279-285, Prentice Hall, Upper Saddle River, NJ.

Tanenbaum, A.S., Computer Networks, 3d Ed., 1998 (approx.), pp. 359-368, Prentice Hall, Upper Saddle River, NJ.

Metz, C., At the Core of IP Networks: Link-State Routing Protocols, IEEE Internet Computing, Sep. Oct. 1999, pp. 72-77.

PCT International Search Report of Oct. 23, 2000.

PCT Written Opinion of Dec. 10, 2001.

Holdredge, M. et al., "Protocol Complications with the IP Network Address Translator," RFC 3027, pp. 1-20, Jan. 2001.

Srisuresh, P., et al., "DNS Extensions to Network Address Translators (DNS-ALG)," RFC 2694, pp. 1-29, Sep. 1999.

Srisuresh, P., et al., "IP Network Address Translator (NAT) Terminology and Considerations," RFC 2663, pp. 1-30, Aug. 1999.

Srisuresh, P., et al., "Traditional IP Network Address Translator (Traditional NAT)," RFC 3022, pp. 1-16, Jan. 2001.

Vixie, P. (Ed.), et al., "Dynamic Updates in the Domain Name System (DNS Update)," RFC 2136, pp. 1-26, Apr. 1997.

Supplementary European Search Report for European Application No. EP00952125, mailed Aug. 8, 2007.

\* cited by examiner

COMPUTER NETWORK WITH UNIQUE IDENTIFICATION

CROSS-REFERENCE TO RELATED APPLICATION

This application is related to U.S. patent application Ser. No. 10/344,784, filed Feb. 13, 2003, now U.S. Pat. No. 7,293,077, issued Nov. 6, 2007.

FIELD OF THE INVENTION

The present invention relates to computer networks which use the IP protocol, and which include data link layer addresses, such as networks incorporating Ethernet and WaveLan technologies, as well as token ring and FDDI (Fiber Distributed Data Interface) technologies.

BACKGROUND OF THE INVENTION

All nodes on the Internet are identified by IP addresses. Unfortunately, due to the limited public IP address pool that is available, and to administrative and maintenance requirements, it is often not possible to allocate a static IP address to a user. Instead, a user may, for example, receive a different IP address for each Internet access session.

This can cause problems in identifying an end user on an intranet or on the Internet.

Various solutions to this problem have been provided, such as DDNS (Dynamic Domain Name System), which uses dynamic mapping of hostnames to IP addresses, X503 client certificates, which have user information embedded within them, and even simple user login authentications.

These solutions, however, have their own limitations, such as additional client software support requirements and a dependency on end users to initiate communication.

An aim of the present invention is to provide a network system that facilitates the identification of an end user. Although the present invention may provide an alternative to the above-mentioned solutions, it need not be mutually exclusive with them.

The present invention is also particularly, though not exclusively, useful in respect of computer systems as described in International Patent Application PCT/SG00/00107, filed on 17 Aug. 2000, and the U.S. National Entry therefrom, Application Serial No. 10/344,784, filed Feb. 13, 2003, both entitled "Reconfigurable Computer Networks," the contents of which are incorporated herein by reference.

SUMMARY OF INVENTION

According to a first aspect, the present invention provides a computer network system including a plurality of client nodes, each of which has a unique data layer link address, wherein the system includes at least one network device which is able to access the data link layer address of a client node, and wherein the network device uses the accessed data link layer address to uniquely identify the client node and to provide network layer or above (e.g., application layer) services to the node based on said data link layer address.

In accordance with the present invention, a router (as the network device), for example, may monitor the data link layer information, e.g., as contained in a data packet transmitted by a client node, in order to extend the functionality of standard network and application services, and can use the data link layer address of a client node to uniquely identify a host and its associated end user.

The present invention contrasts with the traditional approach of using an IP address to provide such services and to map to a client node.

The data link layer address may typically comprise a medium access control (MAC) address. Every client node of a network includes at least one attached network interface card NIC (otherwise called a network card or network adapter card) in order to allow it to physically connect to the network. Each of these cards has a unique MAC address associated with it. These MAC addresses include a six-byte field. The first three bytes (the OUI-Organisational Unique Identifier) identify the vendor of the card and are globally assigned by the IEEE. The final three bytes are vendor assigned in a manner which ensures that each card has a unique address.

The rationale behind the present invention is that the hardware, that is, the network cards, with their default hard-coded MAC addresses are less likely to change compared to other software controlled network settings, and so instead of relying only on IP addresses to identify a node in the network and application layers, the MAC address is used.

In a preferred embodiment, the system includes a link aware router which is able to determine the link layer address of a client node which has sent a data packet, and includes a database of link layer addresses and user information, which may be hosted by the router. The information may, for example, relate to the department in which a user of the client node is registered and to their level of authority and security clearance.

Thus, when a request, such as an HTTP request, is received from a client node, the router is able to identify the client node from its MAC address and can implement one or more suitable network and application policies that a network administrator may define for the client nodes.

For example, in the case of an HTTP request, the router may provide a transparent proxy function to provide a different web page to two client nodes when they request the same URL. This may be dependent on, for example, the department in which the client nodes are registered. Alternatively, access to certain functions such as email, web pages, FTP (File Transfer Protocol), or the like, may be denied and/or may be restricted to include or exclude certain domains.

In one preferred form, for example, where the system is a reconfigurable computer network, as disclosed in PCT/SG00/00107, the router may determine whether an end user's link layer address is included in the database, and may initiate a configuration procedure when said address is not in said database, e.g., by redirecting an HTTP request from the client node to a configuration page.

Further, preferably, the router determines whether a client node's link layer address is included in the database, and initiates a security procedure when said address is not in the database, e.g., by redirecting an HTTP request to a web page warning that there is an unauthorised access attempt.

The system may also determine positional information of a client node and may record the information in the database. This information may, for example, be the number of the network card NIC (e.g., eth0 for Ethernet card number 0) of the router at which data packets from the client node are received. It may also comprise information regarding a client node's assignment to a virtual LAN, e.g., a VLAN ID. Thus, as well as MAC address determined services, the client node may be provided with location specific services, such as location specific web page content.

In a particularly preferred embodiment, the system includes a transparent DNS (Domain Name System) server, which may be hosted at the link aware router. When using a DNS server, the DNS server preferably assigns a unique name to a client node by mapping the client node's link layer address with the name. This name may be, for example, a fully qualified domain name (FQDN) or a hostname. It would also be possible to assign other attributes to the link layer address that might previously have been associated with an IP address. This could include network resources, e.g., a printer and dynamic firewall rules (e.g., non-static IP).

By directly mapping a MAC address to a DNS A type resource record, it is possible to assign an FQDN or a hostname to an end user computer without additional support from the client, and a node can always reach a peer correspondent node by its FQDN or hostname within a link aware DNS network, regardless of the peer's current IP address.

Further, preferably the system includes a Network Address Translator (NAT) for mapping a client node IP address to an assigned IP address. This then allows for transparent routing across address realms, in which, for example, the private IP addresses of a LAN are mapped to one or more public addresses, and possibly to one or more IP address and port combinations when using a Network Address and Port Translator (NAPT). For convenience, in the description herein the term NAT should be taken to cover NAPT.

Preferably, the Network Address Translator uses a client node's link layer address in the mapping of an IP address of said end node to an assigned node. This then allows client node's having the same IP address to be serviced by the NAT.

Where, for example, a configurable router as in PCT/SG00/00107 is provided, the Network Address Translator may use physical location information for a client node in the mapping of an IP address of the client node. This may include the router NIC number at which packets from a client node are received, as well as a VLAN ID.

Preferably, the Network Address Translator provides a reverse NAT operation, in which an assigned IP address is mapped to a client node IP address and data link layer address.

Further, preferably, the Network Address Translator provides a twice NAT operation in which mapping is provided both for a client node IP address to an assigned IP address and for an assigned IP address to a client node IP address and its data link layer address.

Viewed from a further aspect, the present invention provides a computer network system including a plurality of end systems, a NAT router, and a DNS server, wherein said router is able to determine the link layer address of the end systems, and wherein NAT and DNS procedures are based on said link layer addresses, each link layer address being associated with a unique name.

From another aspect, the present invention provides a computer network system including a plurality of end systems and a NAT router, wherein said NAT router creates bindings between actual source end system IP addresses and apparent source end system IP addresses, and wherein said NAT router records the link layer addresses of said source end systems as a part of said binding.

Viewed from a still further aspect, the present invention provides a computer network system including a plurality of end systems, and a DNS server, wherein said DNS server maps link layer addresses of said end systems with unique names.

Viewed from another aspect, the present invention provides a computer network system including a plurality of end systems and one or more intermediate systems, and in which data is transferred between the end systems through the intermediate systems using network and link layer protocols, wherein the end systems are uniquely identified in the system by assigning a unique name to the link layer address of each end system, said unique name being used in the routing of data to the end systems by the intermediate systems.

Viewed from a further aspect, the present invention provides a computer network system including a plurality of client nodes and a proxy server, wherein the proxy server is configured to retrieve data link layer address information from data packets sent by said nodes and to service said client nodes in accordance with network level or above (e.g., application level) policy specifications based on said data link layer address information.

Viewed from a still further aspect, the present invention provides a computer network system including a plurality of network nodes having data link layer addresses and a router for routing traffic from and to the nodes, wherein the system includes a database of the data link layer addresses to attributes of the nodes, the router being configured to determine the data link layer addresses of the nodes and to perform lookups of the database in order to service the nodes.

The present invention also extends to methods of administrating and servicing a computer system in accordance with the above features, and to software and hardware for implementing the same.

BRIEF DESCRIPTION OF THE DRAWINGS

Various embodiments of the present invention will now be described, by way of example only, with reference to the accompanying drawings. It is to be understood that the particularity of the drawings does not supersede the generality of the preceding description of the invention.

DETAILED DESCRIPTION OF THE INVENTION

Figure 1:
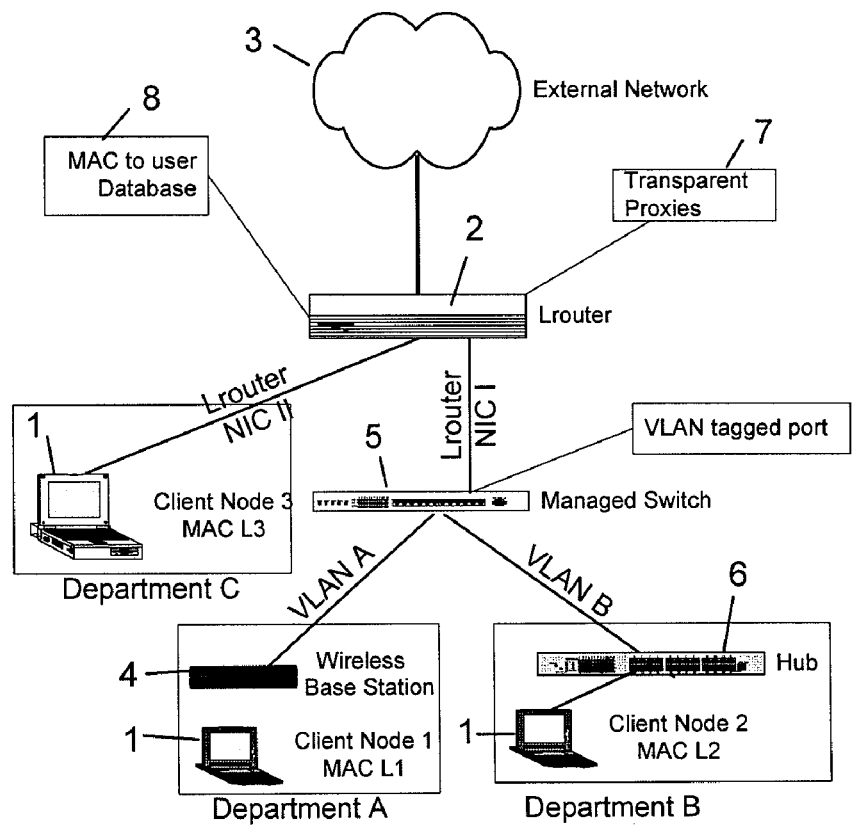
FIG. 1 is a schematic diagram of a possible network topology in accordance with an embodiment of the present invention.

FIG. 1 illustrates one possible network topology for a computer network system incorporating a link aware router in accordance with one embodiment of the present invention, although, of course, many other topologies are possible.

In FIG. 1, a plurality of client nodes 1 is connected to a router 2, which in turn connects to an external network 3. The external network may take many different forms, and may, for example, comprise the Internet.

In this example, one of the client nodes, Node 1, connects to a first network card NIC I of the router 2 via a wireless base station 4 and a managed switch 5 having a VLAN tagged port, while a second client node, Node 2, connects to the same router card NIC I via a hub 6 and the managed switch 5. These nodes, Node 1 and Node 2, are in separate virtual LANs, VLAN A and VLAN B, corresponding to, for example, their departments within an organization running the network, and include identifiers in their outgoing data packets to this effect.

Another of the client nodes, Node 3, is connected directly to a second network card NIC II of the router 2.

The router 2 may provide proxy services to the private network containing the client nodes 1, for example, by using various transparent proxies 7, and may funnel all user requests from the private network to the external network 3 and fan responses back out to the appropriate users. It may also provide other standard proxy services, such as web page and FTP caching, and application firewall protection.

The router may take the form of the reconfigurable router as described in International Patent Application No. PCT/SG00/00107, entitled "Reconfigurable Computer Networks." In this case, the client nodes 1 can be removed from and added to the network at the same or alternative logical and physical network locations at any time, with the router 2 updating its records appropriately at each connect/disconnect in order to allow seamless use of the client nodes 1 by the users of the network. Thus, the location of each client node can be determined from the incoming packet link information (e.g., the VLAN ID embedded in the packet data) and the network card of the router (e.g., NIC I or II) at which packets from the client nodes are received.

Each of the client nodes, Node 1, Node 2 and Node 3, has a unique MAC address, i.e., L1, L2 and L3.

This MAC address is a physical address (i.e., it is hardware specific), and is a unique serial number burned into the network adapter card of the client node when the network adapter is manufactured. The MAC address comprises a six-byte field of which the first three bytes (the OUI—Organisational Unique Identifier) identify the vendor of the card and are assigned by the IEEE, and the final three bytes are vendor assigned.

Generally, these addresses are used in the data link layer of a network, e.g., at the Ethernet or Token Ring MAC level.

In accordance with the present invention, however, these MAC addresses are used also to uniquely identify the client nodes at the network to application layers of the network, and the router 2 is configured so as to be aware of the MAC address of each of the nodes 1.

Thus, the router 2 includes a database 8 of MAC address to user information. This information may take any suitable form, and may relate to details of the user owning the client node, including their name, department and access privileges, as well as the client node current and permitted position information.

By providing such a database, and by enabling the router 2 to obtain the MAC addresses of the client nodes 1, the router 2 is able to provide intelligent service delivery by making available relevant specific network and application services to selective users based on their user profile obtained from the MAC address to user database and, if desired, also based on their logical and/or physical network location (e.g., through VLAN ID and incoming router NIC number).

Therefore, network and application policies can be enforced based on user attributes (e.g., user name, department, and the like) derived from the MAC address, and network location derived from the incoming router NIC number and/or the VLAN ID. This may be in addition to any other standard criteria already supported in existing network applications (e.g., using IP addresses).

As an example, a company may maintain an intranet website, and all employees may be assigned a client node, e.g., a personal computer, with a dedicated network card having a MAC address. A database is then built of all the MAC addresses, together with the end users having these addresses and information relating to these end users. When employees from two different departments access the same URL from their assigned computers, they can be shown different web pages relevant to their departmental needs. This is possible even if they have the same IP address or connect to the same network point, because of the use of their unique MAC addresses to identify them.

Additionally, it is possible that for different physical network locations, the same employee, as identified by their MAC address, may be served different web pages for the same URL in cases where the page content is location dependent.

This example can be implemented using a transparent HTTP proxy with the router 2. Thus, every HTTP request may be intercepted by a firewall of the router 2 (e.g., by determining the destination port number 80, 8080 or 3128 in the TCP header of a packet, or by intercepting all outgoing TCP packets and analyzing the payload for HTTP requests, e.g., "GET http://*.*.* HTTP/1.0"), and will be redirected to the HTTP proxy (e.g., via destination IP address NAT, instead of traditional source IP address NAT). The proxy then retrieves the request's source MAC address, as well as VLAN ID and incoming router NIC information, if applicable, and carries out a lookup of the related information based on the MAC address, and on the VLAN ID and incoming router NIC information, if applicable. It then maps the original request to a different URL as necessary based on the information, and issues a proxy request to the new URL.

In the above, the firewall may do a destination IP address NAPT, e.g., a destination address and port of www.antlabs.com, 80, may be NAPT to a destination IP address of a local host and destination TCP port 3128 where the proxy resides. A TCP socket connection may then be established between the client and the transparent proxy, instead of with the web server www.antlabs.com. Each TCP socket will store the end nodes session information augmented to include the client MAC address and the incoming NIC logical index number (as each VLAN ID monitored by a NIC is assigned a new logical number, it is possible to derive the NIC and VLAN ID from the logical number). For each intercepted TCP packet read by the proxy, a socket option call may be made to obtain the client MAC address and NIC logical number of the selected socket.

In another example, where the router has the zero configuration capabilities as described in PCT/SG00/00107, the combination of both technologies can be used to configure a new network appliance remotely via a web-based GUI.

Thus, the router 2 can detect HTTP requests from an alien MAC address not listed in the database, and, for example, originating from a router NIC that is assigned for remote configuration, and can redirect the end user to a default start-up configuration page.

Thus, for each new user detected, a start-up page can be used to register the user's information, such as name, department, preferences (e.g., future start-up page), preferred printer, etc. This feature may also be used to configure a new network appliance such as a web server (a "black box" web-based administrated appliance rather than a traditional computer server), for which it is problematic to provide an initial IP address. With the present invention, there is no need to set an initial IP address, instead, the web server can simply be plugged in and its web browser started. The start-up configuration page will then be presented, and from there, web based administration can set an IP for WAN connection and other appliance configurations, etc.

Further, using a similar approach, the router 2 may be used as a security access control device. Thus, instead of typical packet-based firewall controls based on IP addresses, which are susceptible to IP spoofing, any HTTP request from an unregistered client node network adapter card (i.e., from a card without its MAC address registered in the database) can, be redirected to a web page warning, which informs the end user that they are attempting an unauthorised access.

In this manner, and unlike existing application firewalls, security controls can be provided all the way from the physical socket connection to the user (identified by their MAC address) for each individual application.

As well as providing the service delivery, the use of the MAC address allows the router 2 to make suitable return packet forwarding decisions by the direct use of the MAC address.

Figure 2:
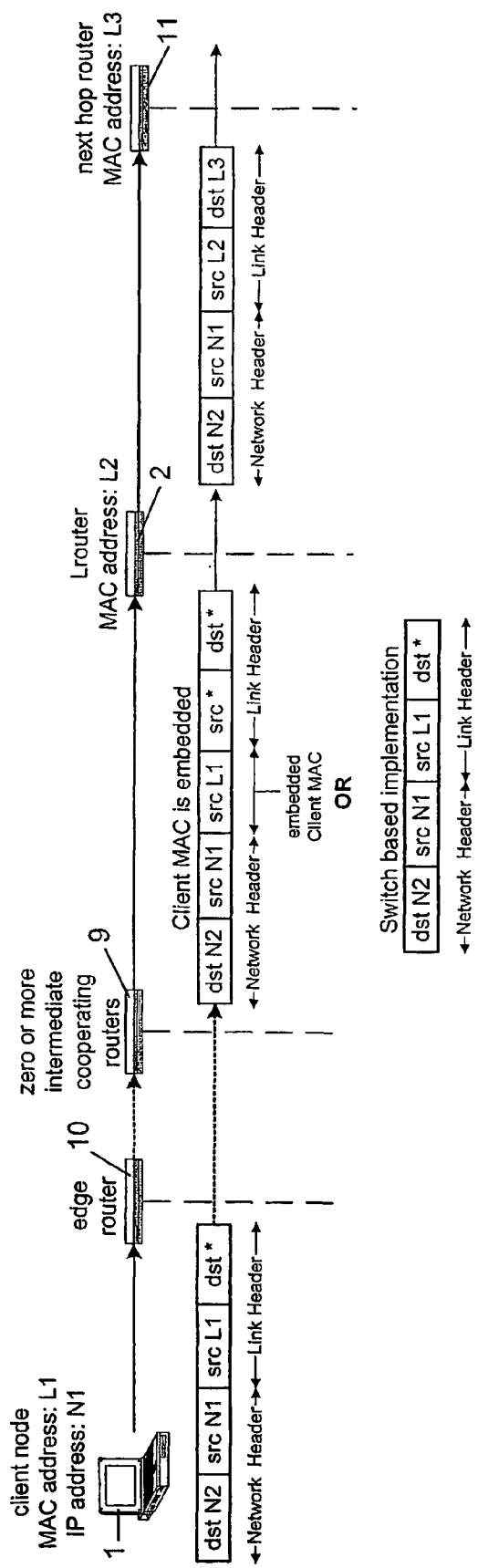
FIGS. 2 and 3 are schematic diagrams illustrating outgoing and incoming traffic from and to a client node of a computer network to and from a link aware router with one or more intermediate systems according to an embodiment of the present invention.
Figure 3:
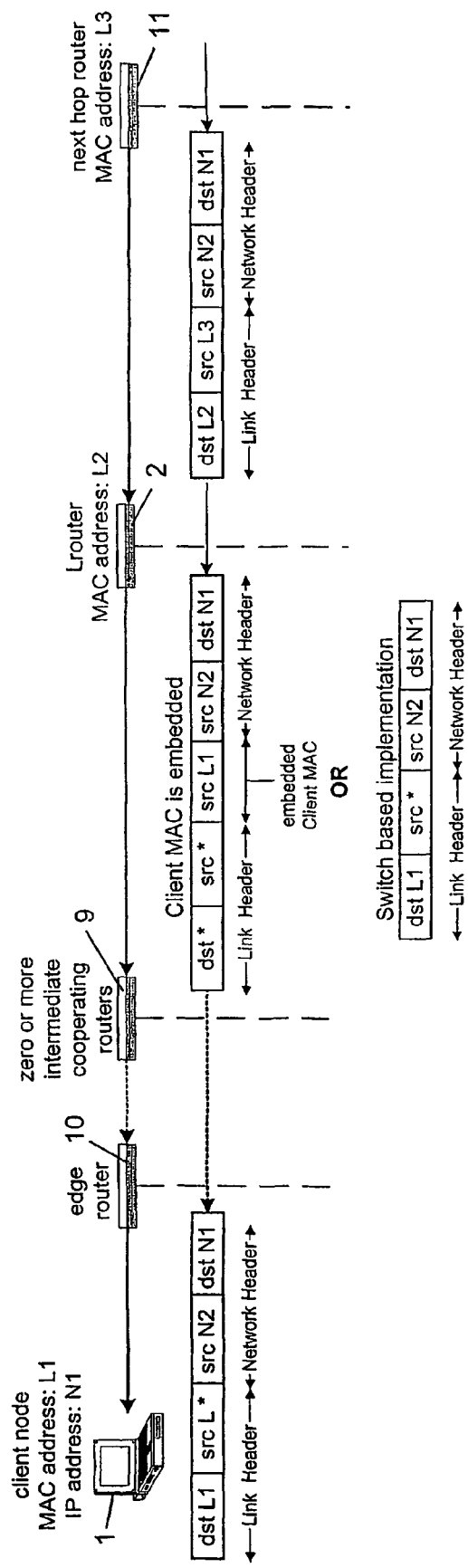

FIGS. 2 and 3 illustrate how outgoing and incoming traffic from and to a client node 1 could be configured in e.g., the system of FIG. 1, although the figures here show the possibility of other routers also provided between the client node 1 and the link aware router 2.

In general, at least one of the client nodes 1 between two communicating nodes (in this example a node with MAC address L1 and IP address N1) should be one router hop from the link aware router 2. There can, however, be multiple intervening layer 2 switches (VLAN or otherwise) between the client node 1 and link aware router 2. There may also be cooperating routers 9 (e.g., transparent routers or a router in accordance with PCT/SG00/00107) between the client node 1 and the link aware router 2, that may, for example, provide the information necessary for the link aware router 2 to be able to inform a cooperating edge router 10 to generate and send the correct outgoing packet layer 2 link header back to the client node.

The intermediate routers 9 route packets to the link aware router 2 to allow it to determine policy decisions. If desired, they can make routing decisions for outgoing traffic, e.g., based on the destination IP address, it is possible for traffic to be sent to a different link aware router. They may also enable routing from one VLAN to another.

As can be seen in FIGS. 1 and 2, the client node MAC, L1, may be embedded in a data packet between a link header (containing source and destination physical addresses) and a network header (containing source and destination IP addresses). Alternatively, in a switched based implementation, where the source MAC address does not change, the client MAC may form a part of the link header. These are only two examples, and other means of providing the client MAC address to the link aware router 2 and to the edge router 10 are possible, e.g., with out-of-band messages.

Routing operations between the link aware router 2 and the next hop router 11 on the e.g., Internet side of the router 2 will proceed as is known in the art, e.g., with the router 11, and the like, determining the destination of the data packet from the IP address destination in the network header and routing the packet according to routing tables for the IP addresses.

The link aware router 2 may also provide NAT (Network Address Translation) or NAPT (Network Address and Port Translation), as is known in the art, in order to, for example, map private IP addresses to public IP addresses, and to prevent problems with address collisions. NAPT allows the mapping of port numbers also, and for the purposes of the present application, references to NAT should be taken to include reference to NAPT and other variants of NAT (e.g., twice NAPT is used for port forwarding, and destination NAT is used by transparent proxies) also.

In the present invention, a link aware router, such as the router 2 of FIG. 1, may provide a NAT capability, which also incorporates the MAC address of a client node in the mapping.

Thus, the NAT function may operate in the same manner as standard NAT functions (including any variants, such as destination NAT and e.g., as noted in "IP Network Address Translator (NAT) Terminology and Considerations," RFC 2663, P. Srisuresh, M. Holdrege, August 1999) except for the following:

1) For every new incoming session that is NAT, the client MAC address, as well as if applicable, the incoming router NIC number and any other optional location specific information (e.g., VLAN ID), is stored in the binding of the original and given IP addresses in addition to other normally required NAT information.

2) For any matching reverse session traffic that maps the client IP address (and, additionally, a transport port number for NAPT) back, the router for the traffic forwarding uses the previously stored link information to generate the packet and transmit the packet to the client, and bypasses the normal route processing.

For step 2 above, if the client is mobile and movement detection is supported (e.g., as in PCT/SG00/00107), the router NIC number to which the outgoing traffic is sent may not be the same as that previously recorded in step 1, and this information should be updated by the presence detection process. The MAC address will not however change.

The link aware NAT procedure allows two clients with the same IP address to use NAT even if they are in the same link broadcast domain since they can be discriminated from one another by their MAC addresses, and as the return routing does not need to, for example, issue an ARP request.

In order for communications between two nodes with the same IP address, there must be a separate unique end-to-end form of identification, e.g., a fully qualified domain name (FQDN).

Both examples of link aware NAT procedures and the provision of FQDNs are discussed below in relation to a further feature of the present invention, which is link aware dynamic domain name servers.

As discussed above, the MAC address of a network interface card attached to a client node 1 can be used to uniquely identify the client node 1 and its associated end user (rather than using an IP address to map to a client node as in the prior art).

Extending this concept to the DNS system, it is possible within a network serviced by a link aware dynamic DNS system to assign a fully qualified domain name (FQDN), e.g., john.antlabs.com, or a hostname, e.g., john, to an end user computer without additional support from the client.

By directly mapping a MAC address to a DNS A type resource record, a node can always reach a peer correspondent node by its FQDN or hostname within a link aware DNS network, regardless of the peer's current IP address and without the need for a client node to register its IP address.

In a link aware DNS system, each node is identified by its MAC address, and by monitoring the network traffic and implementing movement detection e.g., as described in PCT/SG00/00107, a link aware router can determine the location of each client node and their associated MAC and IP address.

Figure 4:
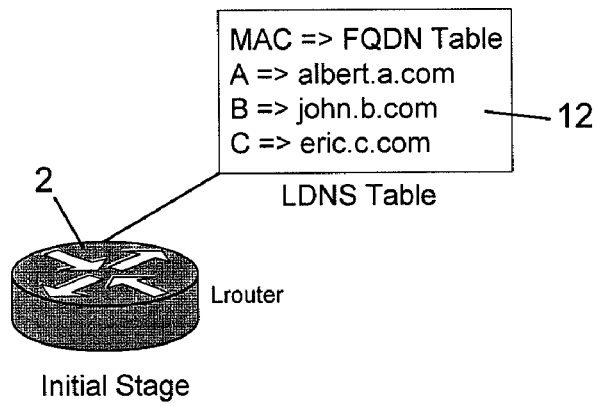
FIG. 4 is a schematic diagram of a link aware router hosting a link aware DNS server in accordance with an embodiment of the present invention.

As shown in FIG. 4, a link aware DNS system may consist of a link aware router 2 and a link aware DNS server, which may be hosted on the link aware router 2, and includes a pre-configured MAC address to FQDN table 12.

For an internal LAN with no address collision, the simplest mechanism would be for the link aware router to dynamically set-up host-based routes and update the DNS with the actual IP address of each individual client it discovers.

When a client resolves a FQDN or hostname, the actual current IP address of the host is returned. Any traffic destined for the corresponding host will be forwarded by the established dynamic host-based routes (which may change if the client node moves).

Figure 5:
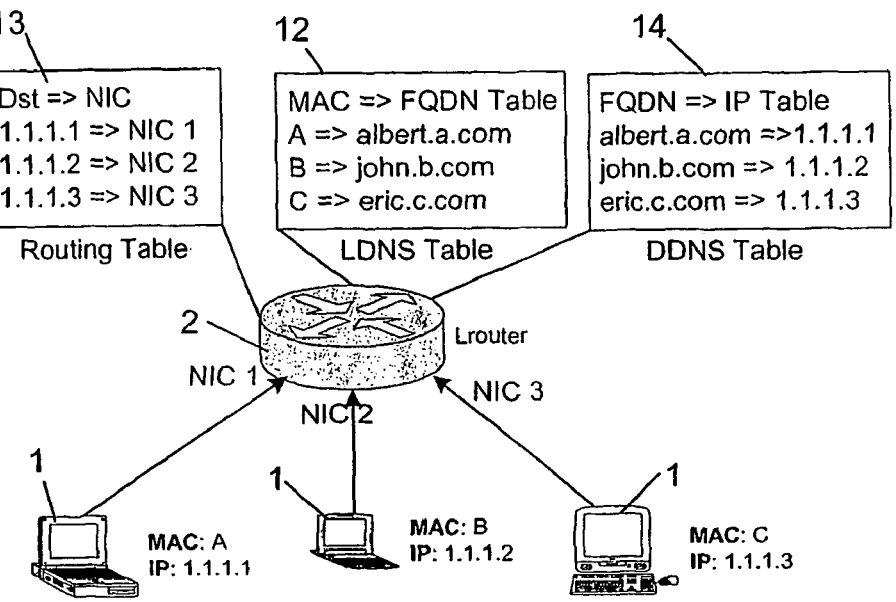
FIGS. 5-7 are schematic diagrams illustrating how a router as shown in FIG. 5 may be used in the routing of traffic between two nodes of an intranet.

FIG. 5 illustrates such an internal LAN. When traffic is generated by a client node 1, a routing table 13 and a DDNS table 14 on the link aware router 2 are updated. For example, if a packet with a MAC address A and a source IP address 1.1.1.1 is received on the router NIC 1, a host-based route is set in the routing table 13. The router then does a lookup in the link aware DNS table 12 for the MAC address A, and this returns the FQDN "albert.a.com." The DDNS table 14 is then updated to reflect the IP address 1.1.1.1 for the FQDN "albert.a.com."

Figure 6:
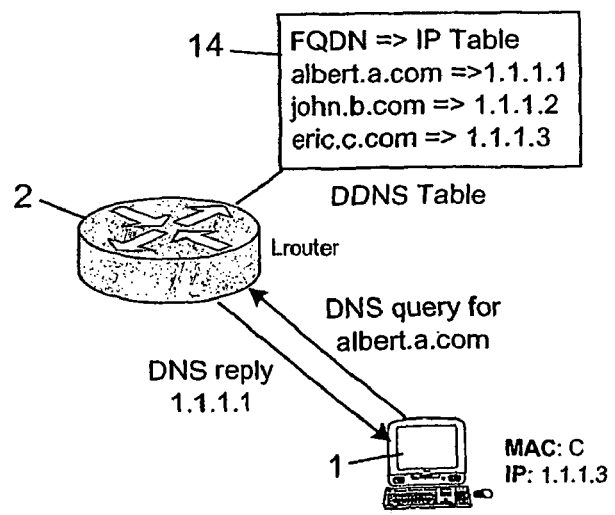

When a client node 1, as in FIG. 6, carries out a DNS query, e.g., for albert.a.com, the query is intercepted by the transparent link aware DNS server of the link aware router 2. If the FQDN is found in the DDNS table 14, then the current IP address of the FQDN, e.g., 1.1.1.1, is returned in the DNS reply. If it is not found, then recursive DNS resolution is employed, as per standard known DNS operations.

Figure 7:
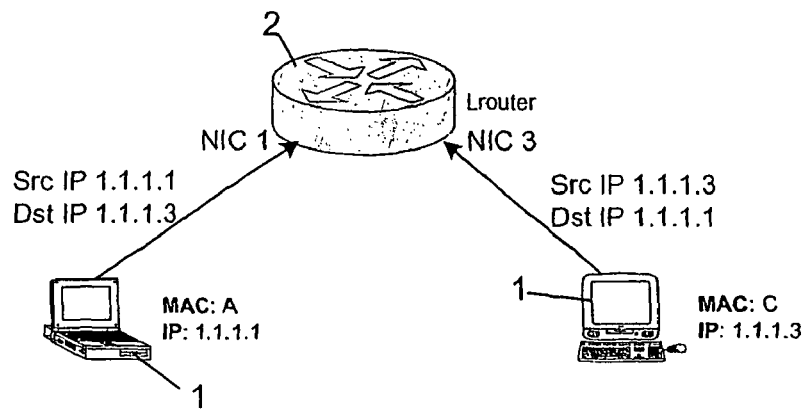

Once the FQDN is resolved, as shown in FIG. 7, traffic can be routed between the sending and receiving nodes 1 through the router 2 due to the pre-established host-based routes of routing table 13 shown in FIG. 5.

In cases where address collision exists, or where communications occur across two or more routing realms, a form of NAT can be applied with the link aware DNS server.

For example, in the case of cross routing realm communications without network collisions, a permanent FDQN or hostname can be used to find a client node's IP address and to send traffic to that IP address. When the client correspondent node receives a datagram from a sending node, there is no need for it to do a similar name lookup on the sender's FDQN or hostname, as the destination IP address (i.e., the IP address of the sender) is already known by the correspondent node from the datagram received. Therefore, in this case, name lookup need only be done in one direction.

If the IP address of the node that initiates the name lookup is unique, i.e., there is no address collision), then the link aware router need only support Domain Name Server Application Level Gateway (DNS_ALG), and if there is no address collision in the private network, then NAT with DNS_ALG will suffice. The link aware DNS server will still need to update the correspondent node IP address in the DDNS table 14 on client node discovery.

Figure 8:
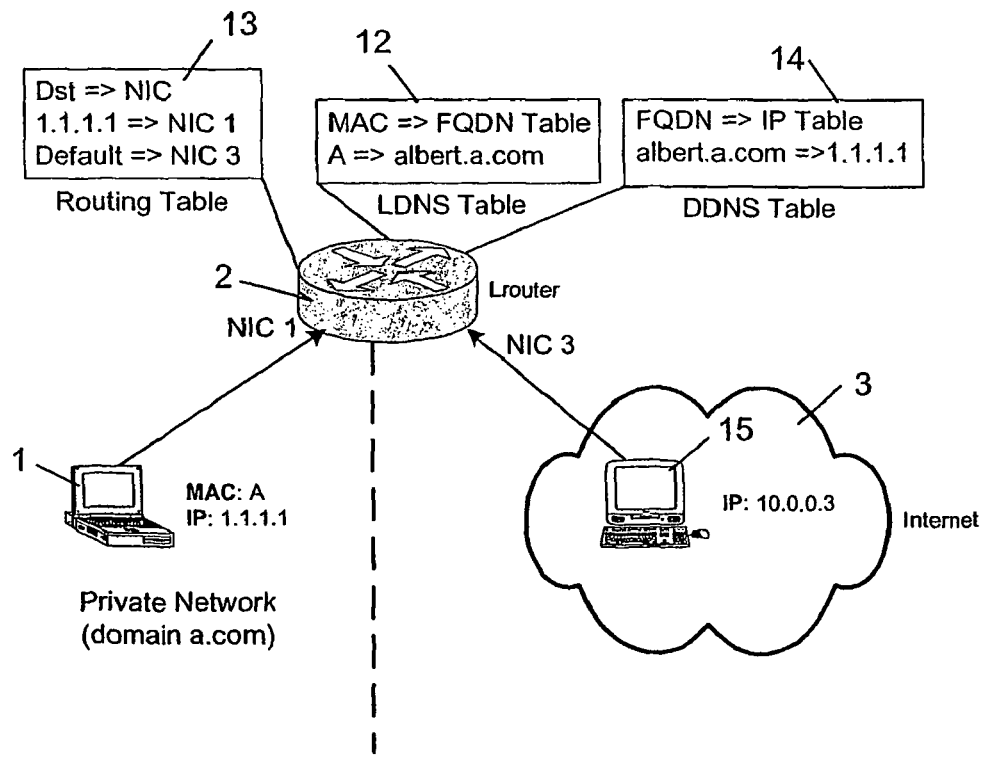
FIGS. 8-11 are schematic diagrams illustrating a router in accordance with an embodiment of the present invention connecting nodes across a routing realm boundary.

FIG. 8 shows an example of a no collision communication across a routing realm between a node 15 of a public network 3 such as the Internet and a client node 1 of a private network having a registered domain name "a.com" and a link aware router 2 that is NAT capable, supports DNS_ALG and is the authoritative name server for the domain "a.com."

As shown in FIG. 8, the link aware router 2 has discovered the client node MAC address A and has updated the routing table 13 (for the incoming NIC of the router 2 on which the packet from client node 1 was received) and the DNNS table 14 for "albert.a.com."

Figure 9:
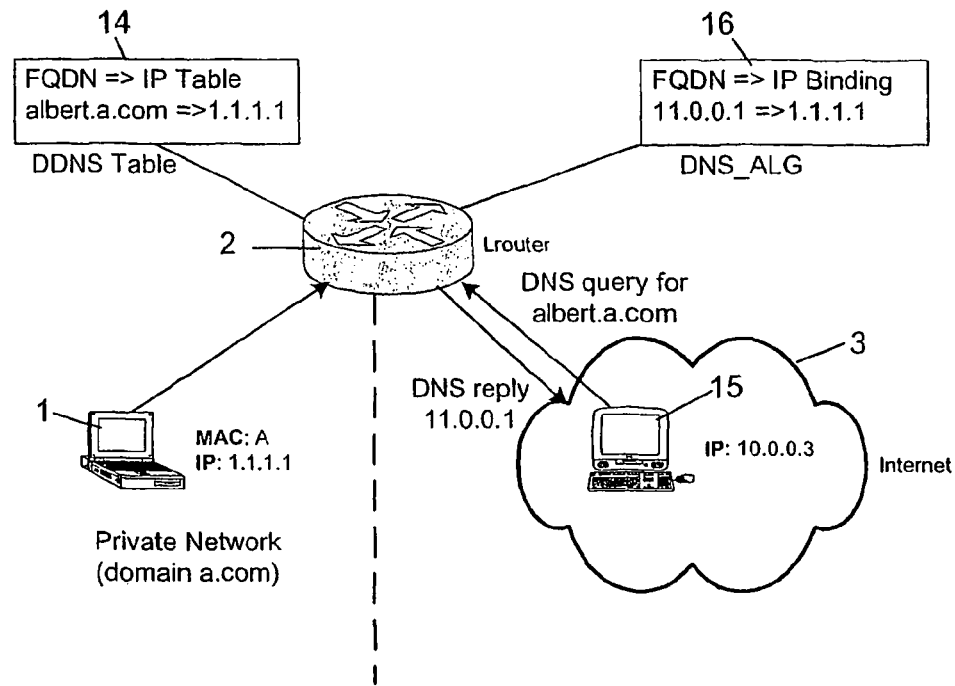

As shown in FIG. 9, when the public network node 15, with IP address 10.0.0.3 tries to resolve "albert.a.com," the DNS query is sent to the link aware router 2 since it is the authoritative name server for the "a.com" domain. The DNS_ALG thus queries the private network link aware DNS server, i.e., the DDNS table 14, which returns the result 1.1.1.1. The DNS_ALG then sets up an address binding 16 to map the client node's IP address 1.1.1.1 to a public IP address that belongs to the link aware router 2 for NAT purposes, in this case the IP address 11.0.0.1, and transmits the DNS reply of 11.0.0.1 to the requesting node 15.

Once the DNS resolution is completed, communication between the two nodes 15 and 1 proceeds as standard, as documented in "DNS Extensions to Network Address Translators (DNS_ALG)," RFC 2694, P. Srisuresh, G. Tsirtsis, P. Akkiraju, and A. Heffernan, September 1999.

Figure 10:
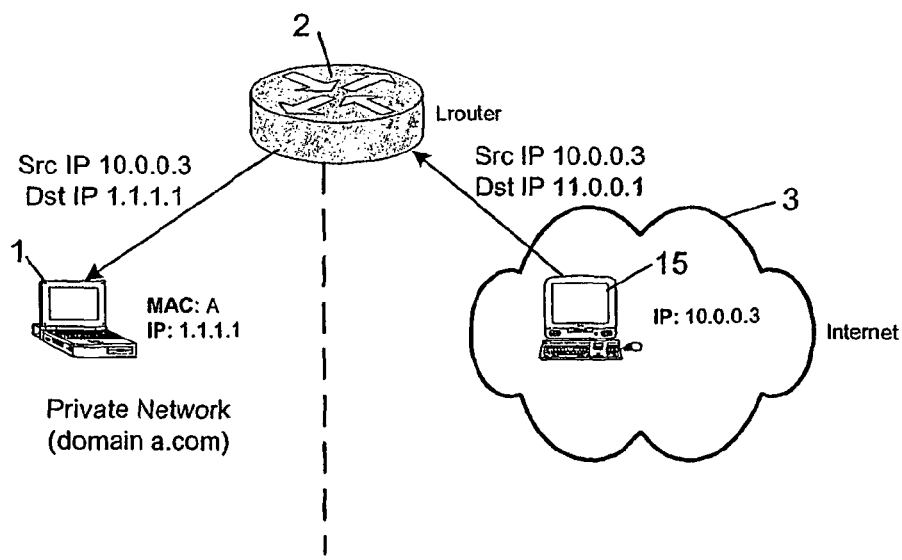
Figure 11:
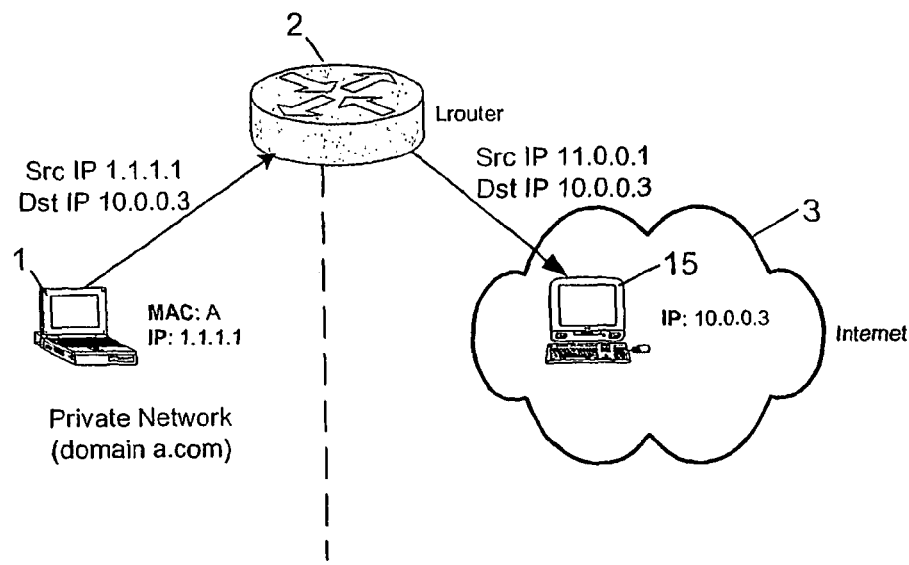

FIG. 10 shows the resulting NAT operations for traffic from the node 15 with IP address 10.0.0.3 to the correspondent node 1 with IP address 1.1.1.1, while FIG. 11 shows the NAT operations for reply traffic from the correspondent node 1 to the public node 15.

Turning to the possibility of address collisions, one such collision is an address collision between a correspondent client node (the target of a name lookup by an external node) and another client node on the same private network. This may be addressed by having the link aware router support reverse link aware NAT. This requires the use of the client nodes' link layer information.

In this situation, as communication is established by a public node outside of the private network rather than by one of the private nodes 1 with the collision problem, the reverse link aware NAT link layer information may be established when the binding information is created by the DNS_ALG.

For communications across routing realms, e.g., from the Internet 3 to a private network, there is a need to assign a public IP address to the correspondent node 1 of the private network.

For all scenarios, a unique IP address (not necessarily public) that does not collide with any other possible correspondent nodes must be used.

Figure 12:
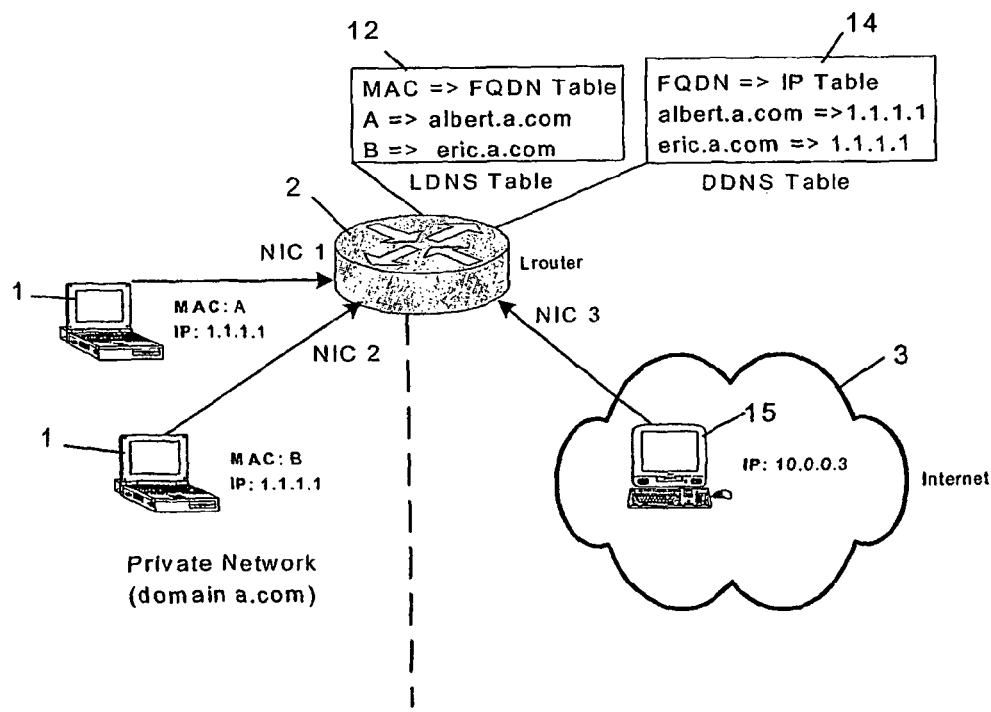
FIGS. 12-14 are schematic diagrams illustrating a router connecting nodes across a routing realm, wherein an address collision occurs between a receiving node and another node in the receiving node's intranet.

FIG. 12 shows a link aware DNS table 12 and a DDNS table 14 for the private network a.com with two client nodes 1 having the same IP address 1.1.1.1.

Figure 13:
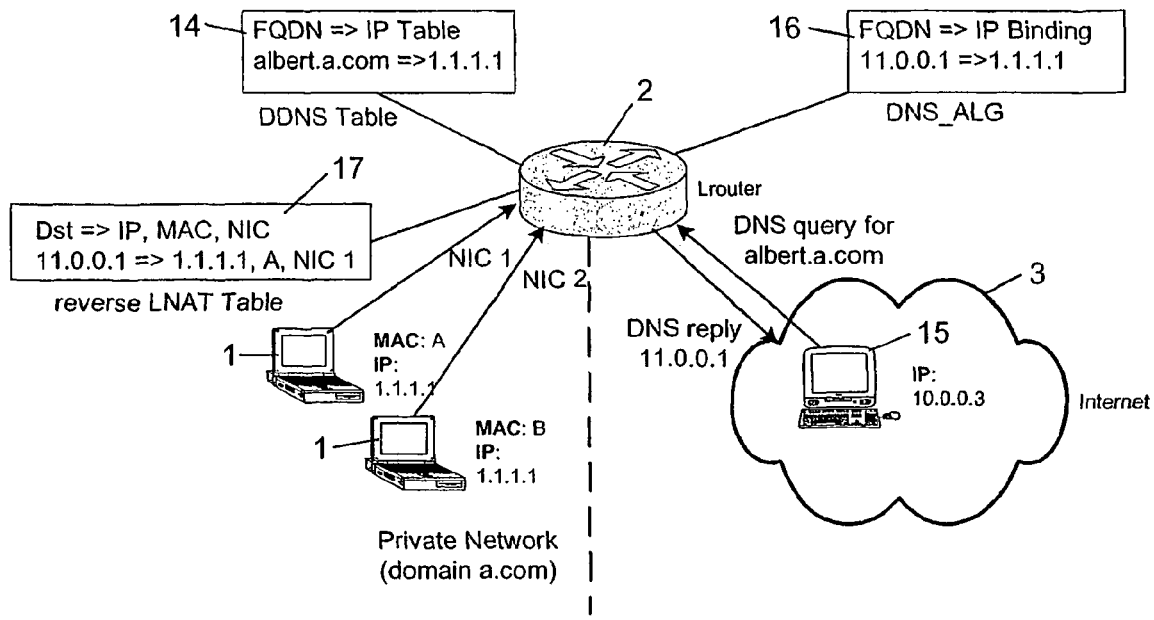

As in the no-collision embodiment of FIGS. 8-11, and as shown in FIG. 13, when a public node 15 transmits a DNS request for "albert.a.com," the DNS_ALG interrogates the DDNS server to obtain the IP address 1.1.1.1 of the correspondent node having the domain name "albert.a.com," and then sets up a DNS_ALG binding 16 of a public IP address 11.0.0.1 with the private client node address 1.1.1.1.

Additionally, in order to enable reverse link aware NAT, the DNS_ALG informs the link aware DNS server of the public IP address 11.0.0.1 assigned to the correspondent node's FQDN. Using this information, the link aware DNS server is then able to build a reverse link aware NAT table 17 mapping the assigned IP address 11.0.0.1 to the appropriate client node characterised by its MAC address A. This can be produced as the MAC address to FQDN/hostname mapping (of the link aware DNS table 12 of FIG. 12) is unique (one-to-one), and so a reverse lookup from the FQDN/hostname to retrieve the correspondent node's MAC address is possible.

As the router 2 monitors the link level and incoming NIC information for each client node 1, in order to update the link aware DNS system, the link aware router 2 can establish the IP address and the network location of the correspondent node 1. With the correspondent node's actual and dynamically assigned (by DNS_ALG) IP addresses, its MAC address and incoming NIC interface information (together with VLAN ID information, if any), reverse link aware NAT can be carried out.

Figure 14:
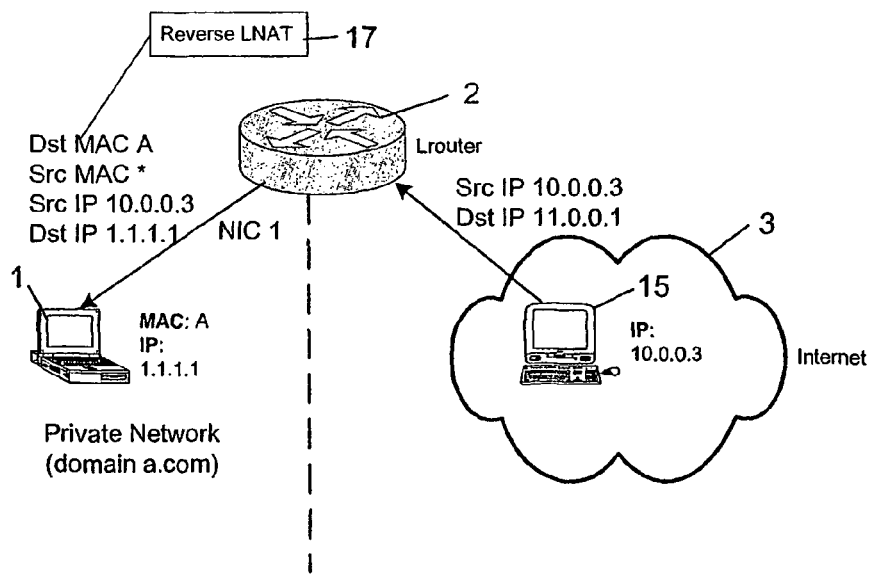

FIG. 14 illustrates the NAT operations for traffic from the node IP address 10.0.0.3 to the correspondent node address 1.1.1.1 with the reverse link aware NAT. Reply traffic from the correspondent node 1.1.1.1, MAC A to the node IP address 10.0.0.3 can be performed using NAT as per standard methods.

Figure 15:
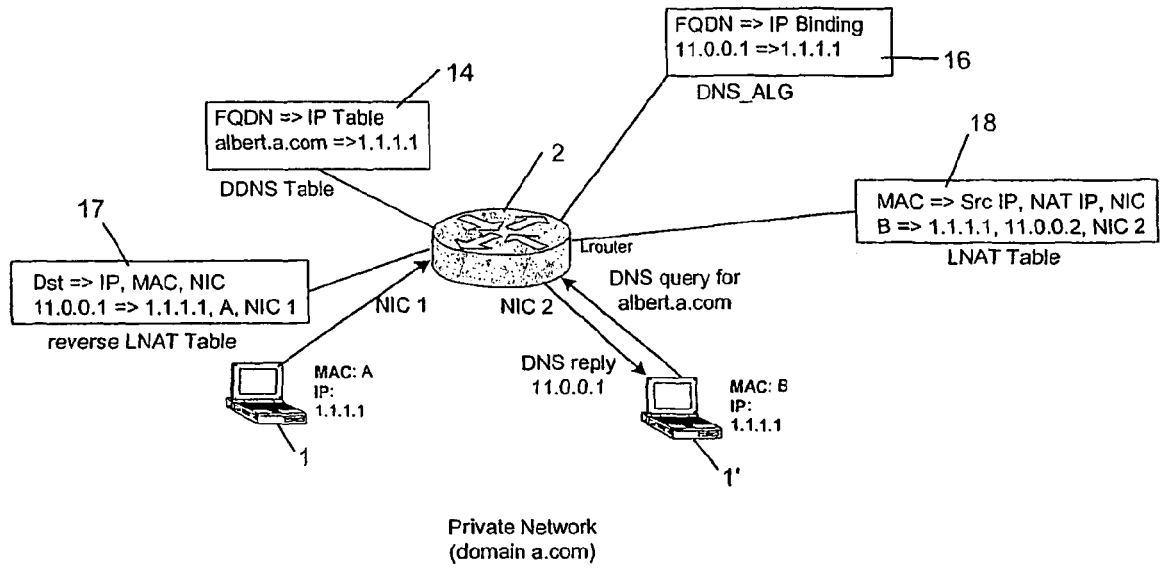
FIGS. 15-17 are schematic diagrams illustrating communications between two nodes within an intranet that have the same IP address.
Figure 16:
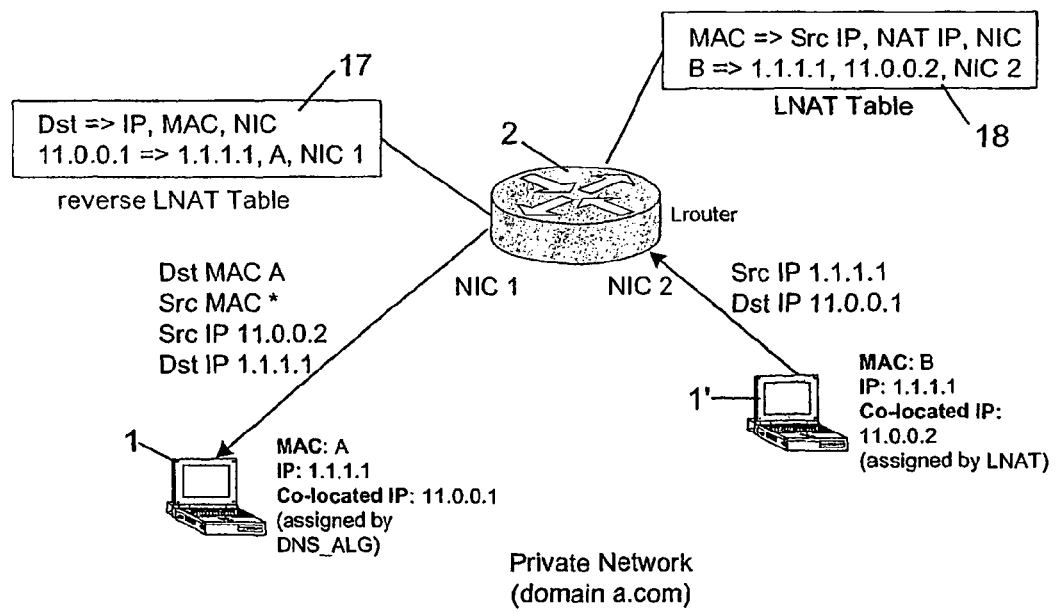
Figure 17:
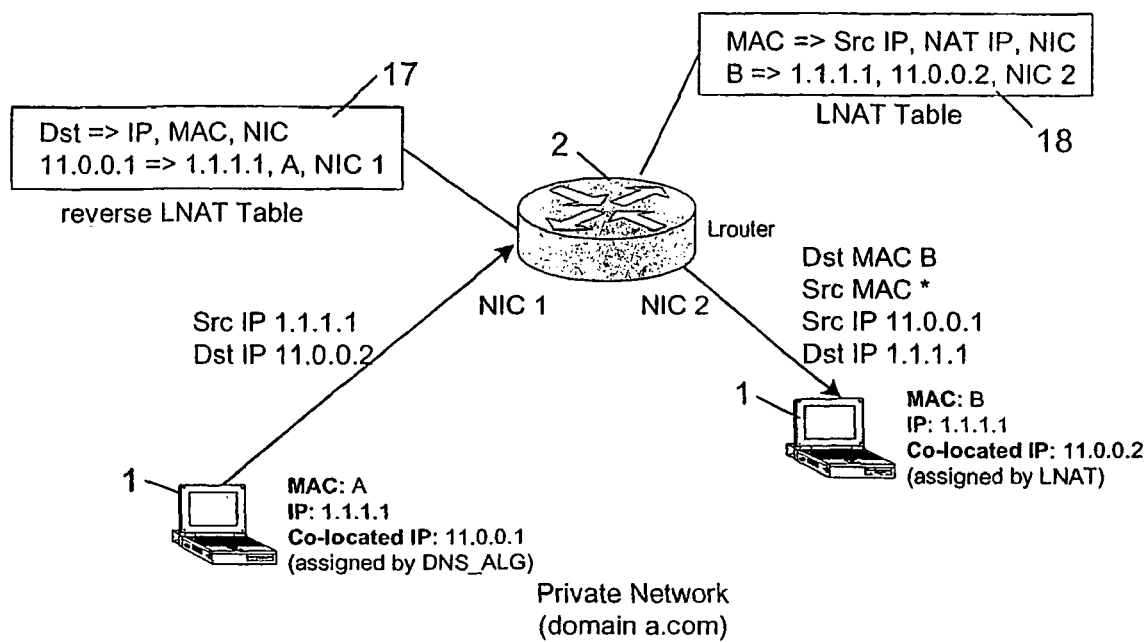

FIGS. 15-17 show an embodiment in which an IP collision exists between the two nodes 1 and 1' within a link aware DNS serviced private network, with no cross routing realm communications (all communicating nodes are one hop from the link aware router 2).

Where such an IP collision exists between communicating nodes, then link aware twice NAT can be used, i.e., link aware NAT is carried out for both the source and destination IP addresses.

In such an approach, a unique IP address (for which there is no address collision), in this case 11.0.0.2 is co-located with the sender node 1' that does the name lookup. The link aware NAT records the co-located IP address 11.0.0.2 and matches it to the sender node IP address 1.1.1.1 and its MAC address B, and incoming NIC information and VLAN ID, if any. This is stored in a link aware NAT table 18.

DNS_ALG then returns another unique IP address 11.0.0.1 that is co-located with the corresponding node 1 in the DNS reply to the sending node 1'. This IP address 11.0.0.1 is stored by the link aware NAT along with the client node's IP address 1.1.1.1 and MAC address A, and NIC interface information and VLAN ID, if any. This can be derived in the same manner as in the embodiment of FIGS. 12-14, and is stored in a reverse link aware NAT table 17.

These two co-located IP addresses 11.0.0.1 and 11.0.0.2 are valid for the duration of any existing communications between the two nodes 1 and 1', before another name lookup.

Any communications between the two nodes 1, 1' are twice NAT. The difference with traditional twice NAT being that the available link layer and NIC information removes the need for any routing table lookup (which breaks when there is an address collision) or ARP requests (which can generate multiple replies when there are address collisions) in order to construct and deliver a packet to any one of the nodes 1, 1'.

The DNS_ALG bindings 16, the link aware NAT table 18 and the link aware reverse NAT table 17 are set up when the correspondent node with MAC address B issues a DNS query.

FIG. 16 illustrates the NAT operations for traffic from the client node 1' with MAC address B to the correspondent client node 1 with MAC address A with link aware twice NAT, while FIG. 17 illustrates the NAT operations from the correspondent node 1 with MAC address A to the client node 1' with MAC address B with link aware twice NAT.

In the case of cross routing realm communications (initiated from a private network to the Internet or vice versa) and address collision occurring between the private node and the public node, a unique IP address within the private network must be co-located with the public correspondent node, a unique public IP address belonging to the link aware router must be co-located with the private node, and twice NAT with DNS_ALG is employed to enable communication as documented in "DNS Extensions to Network Address Translators (DNS_ALG,)" RFC 2694, Section 6. If address collisions also occur within the private network, link aware twice NAT for traffic from public node, to private node, but not for traffic from private node to public node NAT should be used.

Overall, the present inventive features, especially when used with the reconfigurable network system of PCT/SG00/00107, provide many advantages.

The technology is intelligent enough to provide network access on demand to end users without needing administrator intervention, and is configurable when necessary. That which would require reconfiguring end users' systems individually, can be configured and deployed by an administrator for a whole network in real-time, and configuration change can even be applied up to individual user granularity. For example, from a web-based server administration page, a network administrator could remotely: Switch to a new SMTP; change the Intranet web server machine or URL; install and make accessible to all users anew network resource, e.g., a printer; assign a new fully qualified domain name or internal hostname to an end user's computer; or assign a publicly accessible IP address to an end user's computer.

Further, the technology is not only able to connect client nodes to the network, but can be the launch pad for intelligent service delivery. Servers can have a complete database of every client system in a network from their user information to their current location, and an administrator can configure specific services to be made available to selected users, and can specify access to such services based on physical location and user profile.

Permanent human understandable virtual FQDNs or hostnames can be used to identify client nodes, instead of depending on unfriendly IP addresses, and an end user can reach a peer correspondent node by its assigned name, even if the peer changes IP addresses or roams to a new location.

For example, a sales staff with a colour laser printer quota can wirelessly connect to a LAN and specify delivery of an urgent colour brochure to a colour laser printer (restricted access) nearest to a colleague who is in some unknown part of a building. Also, a sales presentation could be digitally transmitted to the first vacant meeting room (with no client nodes detected) and information could be fed back via an automated memo to the specific presenter the instant the presenter is connected to the network.

Security controls can go all the way from a physical socket connection to an actual user's individual applications access and monitoring. Firewall rules, access control and network policies can be implemented from a centralised server with network configurable point-to-point security, and, at the link layer, rules can be imposed on individual clients' link layer MAC addresses and network point of origins. At the network and transport levels, a server can operate like a host-based firewall with dynamic firewall rules, insertion and deletion based on a client's physical location and user classification, etc. A, web-based authentication page can further grant access to specific services to the exact port a user is connected to in real-time. A dynamic firewall could automatically delete the access privileges when a client is disconnected from the network.

At the application level, common application requests like DNS, email (SMTP), and web (HTTP) may be monitored and can have their behaviour controlled based on a physical connection, link frame or network address basis/criteria.

It is to be understood that various alterations, additions and/or modifications may be made to the parts previously described without departing from the ambit of the present invention, and that, in the light of the teachings of the present invention, the various network components and functions may be implement in software and/or hardware in a variety of manners.

The invention claimed is:
1. A computer network system, including:
   a plurality of client nodes, each of which has a unique data link layer address;
   at least one network device which is able to access the unique data link layer address of at least one client node of the plurality;

a database configured to include the unique data link layer address of each client node of the plurality and associated user information for each client node of the plurality, wherein the user information includes at least one of a logical user group, a physical location of the client node, or a logical location of the client node, wherein the physical location of a device node is indicated by an incoming router NIC number and the logical location of a device node is indicated by a VLAN ID;

a dynamic data structure configured to include a DNS binding between the unique data link layer address, a fully qualified domain name (FQDN) and an IP address for one or more client nodes of the plurality;

wherein the at least one network device is configured to:
   use the accessed data link layer address to uniquely identify the at least one client node;
   upon identification of the at least one client node in association with a communication to or from the at least one client node, provide user-specific services at a network layer or above to the at least one client node based on the associated user information corresponding with the unique data link layer address of the at least one client node, wherein providing the user-specific services includes communicating, responsive to the associated user information, human perceivable content that is adapted for the location of the at least one client node or the logical user group;
   receive, from a first client node of the plurality of client nodes, a DNS request specifying the FQDN of a second client node of the plurality of client nodes;
   execute a twice NAT procedure if an IP address collision exists between the first client node and the second client node of the plurality of client nodes, wherein a first unique IP address for which there is no address collision is issued to the first node and a second unique IP address for which there is no address collision is issued to the second node;
   update the DNS binding of the first client node to include the first unique IP address and update the DNS binding of the second client node to include the second unique IP address; and
   return the second unique IP address to the first client node in response to the DNS request.

2. The system of claim 1, wherein said system includes at least one router which is able to determine the data link layer address of a client node which has sent a data packet.

3. The system of claim 2, wherein said router is configured to conduct one or more policies for said client nodes based on said data link layer address and database information.

4. The system of claim 2, wherein said router is configured to determine whether a client node's data link layer address is included in said database, and initiate a configuration procedure when said data link layer address is not in said database.

5. The system of claim 2, wherein said router is configured to determine whether an end user's data link layer address is included in said database, and initiate a security procedure when said address is not in said database.

6. The system of claim 1, wherein said system is configured to determine positional information of the at least one client node and record the positional information in said database; and
   providing the user-specific services is further responsive to the positional information.

7. The system of claim 1, including a DNS server, wherein said DNS server is configured to assign a unique name to a client node by mapping the client node's data link layer address with said unique name.

8. The system of claim 7, wherein the DNS server includes a database of data link layer addresses to fully qualified domain names.

9. The system of claim 7, wherein the DNS server includes a database of data link layer addresses to hostnames.

10. The system of claim 7, wherein when traffic is generated by a client node, the router is configured to determine the unique name for the client node from the data link layer address of the client node, and update the IP address for said name in a DDNS table.

11. The system of claim 1, wherein said system includes a Network Address Translator for mapping a client node IP address to an assigned IP address.

12. The system of claim 11, wherein said Network Address Translator is configured to use a client node's data link layer address in the mapping of an IP address of said client node to an assigned node.

13. The system of claim 11, wherein said Network Address Translator is configured to use physical location information for a client node in the mapping of an IP address of the client node.

14. The system of claim 11, wherein said Network Address Translator is configured to provide a reverse NAT operation in which an assigned IP address is mapped to a client node IP address and data link layer address.

15. The system of claim 11, wherein said Network Address translator is configured to provide a twice NAT operation in which mapping is provided both for a client node IP address to an assigned IP address and for an assigned IP address to a client node IP address and data link layer address.

16. The system of claim 1, wherein providing the user-specific services further includes providing at least one procedure that is adapted based on the user of the at least one client node or a group the user belongs to.

17. A method of servicing nodes on a computer network which includes a plurality of nodes and a router for routing traffic from and to said nodes, including:
   obtaining data link layer addresses for said nodes of the plurality;
   constructing or augmenting a database of said data link layer addresses correlated to attribute information of users associated with said nodes of the plurality, wherein the attribute information includes at least one of a logical user group, a physical location of the node, or a logical location of the node, wherein the physical location of the node is indicated by an incoming router NIC number and the logical location of the node is indicated by a VLAN ID;
   constructing or augmenting a dynamic data structure to include a DNS binding between the unique data link layer address, a fully qualified domain name (FQDN), and an IP address for one or more of the nodes of the plurality;
   performing a lookup of said data link layer address of a node of the plurality in said database when traffic is received from said node;
   providing said node with user-specific services at a network layer or above based on the attribute information of the user associated with the node obtained from said look-up, wherein providing said node with the user-specific services includes presenting information to the user of the node that is adapted for the user or a group the user belongs to responsive to the attribute information of the user; and
   if an address collision occurs when receiving from a first node of the plurality of nodes a DNS request specifying the FQDN of a second node of the plurality of nodes, managing the address collision by:
  executing a twice NAT procedure if an IP address collision exists between the first node and the second node of the plurality of nodes, wherein a first unique IP address for which there is no address collision is issued to the first node and a second unique IP address for which there is no address collision is issued to the second node;
  updating the DNS binding of the first node to include the first unique IP address and update the DNS binding of the second node to include the second unique IP address; and
  returning the second unique IP address to the first node in response to the DNS request.

18. A computer network system, including:
a plurality of client nodes, each of which has a unique data link layer address;
a database configured to include records for client nodes of the plurality, each record comprising the unique data link layer address of a client node and non-IP address information associated with a user of the client node, wherein the non-IP address information includes at least one of a logical user group, a physical location of the client node, or a logical location of the client node, wherein the physical location of a client node is indicated by an incoming router NIC number and the logical location of a client node is indicated by a VLAN ID;
a dynamic data structure configured to include a DNS binding between the unique data link layer address, a fully qualified domain name (FQDN) and an IP address for one or more client nodes of the plurality; and
at least one network device configured to:
  identify an access from an unknown client node as a client node of the plurality that is not included in the database;
  identify position information for the unknown client node;
  add a new record to the database including the position information and the unique data link layer address for the unknown client node to the database;
  perform a lookup of the unique data link layer address of a client node of the plurality in the database for at least some traffic received from the client node; and
  provide the client node with user-specific services at a network layer or above based on the non-IP address information associated with a user of the client node obtained from the lookup.

19. The system of claim 18, wherein the at least one network device is further configured to:
  initiate a security procedure to generate the non-IP address information associated with a user for the unknown client node responsive to the position information; and
  add the non-IP address information associated with a user to the record of the database associated with the position information.

20. The system of claim 19, wherein the at least one network device is further configured to redirect the access from the unknown client node to a start-up page configured to collect at least some of the non-IP address information associated with a user as part of the security procedure.

21. The system of claim 18, wherein the at least one network device is further configured to:
  access the unique data link layer address to uniquely identify at least one client node of the plurality responsive to a communication to or from the at least one client node; and
  provide user-specific services at a network layer or above to the at least one client node responsive to the communication and the non-IP address information associated with a user corresponding to the unique data link layer address.

22. The system of claim 18, wherein the position information comprises a physical location or a network location derived from at least one of a network card identifier and a virtual LAN identifier.

* * * * *

UNITED STATES PATENT AND TRADEMARK OFFICE
CERTIFICATE OF CORRECTION

PATENT NO. : 8,005,981 B2
APPLICATION NO. : 10/480391
DATED : August 23, 2011
INVENTOR(S) : Teo Wee Tuck and Rhandeev Singh It is certified that error appears in the above-identified patent and that said Letters Patent is hereby corrected as shown below:

In the specification:
COLUMN 1, LINE 50, change "OF INVENTION" to --OF THE INVENTION--
COLUMN 5, LINE 17, change "reconfigurable router" to --reconfigurable router,--

In the claims:
CLAIM 17, COLUMN 14, LINE 61, change "look-up," to --lookup,--

Signed and Sealed this
Sixteenth Day of July, 2013

Teresa Stanek Rea
*Acting Director of the United States Patent and Trademark Office*